United States Patent Office 3,238,122
Patented Mar. 1, 1966

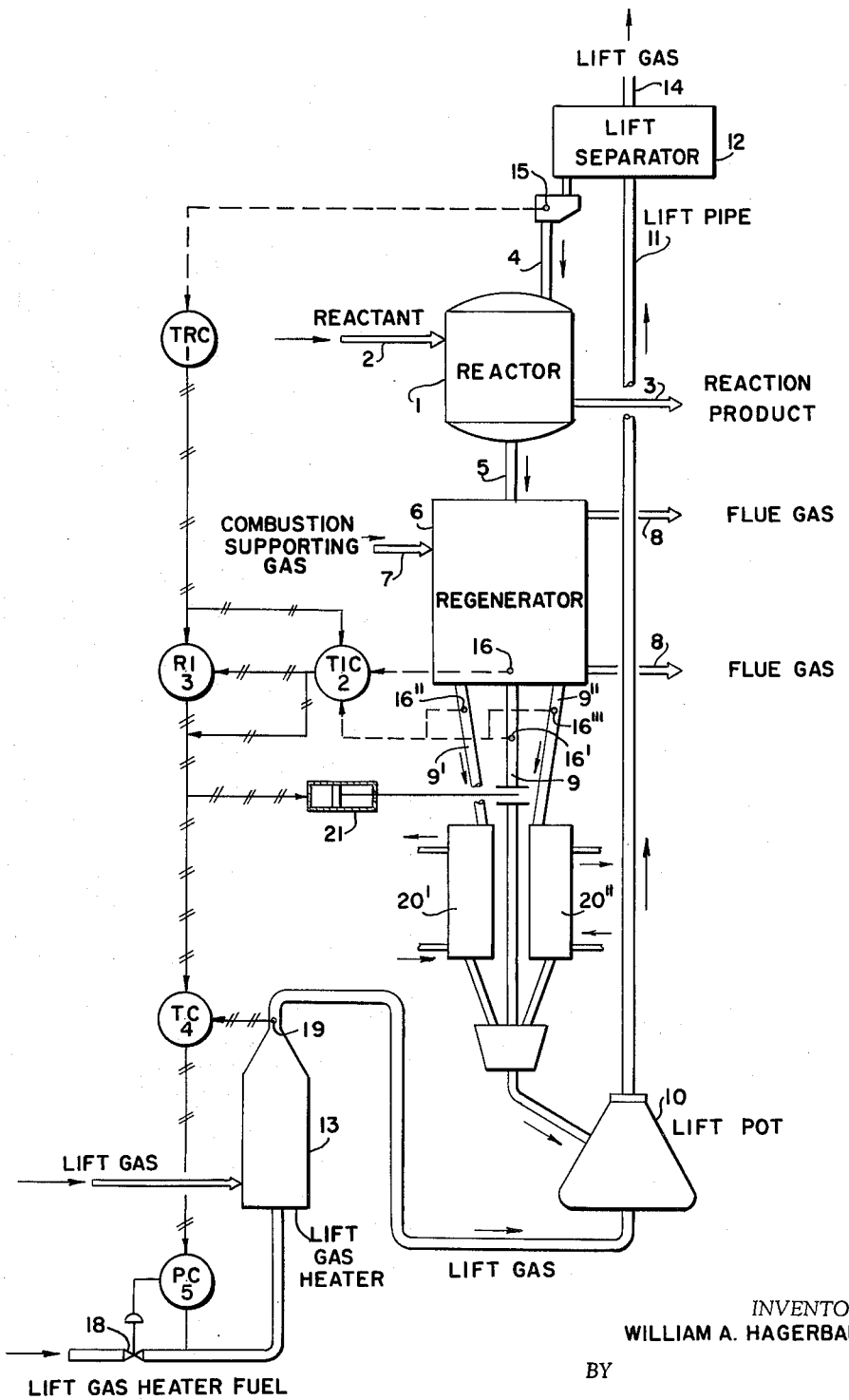

3,238,122
HYDROCARBON CONVERSION PROCESS AND
APPARATUS USEFUL THEREFOR
William A. Hagerbaumer, Westfield, N.J., assignor to
Socony Mobil Oil Company, Inc., a corporation of New
York
Filed Jan. 17, 1964, Ser. No. 338,444
22 Claims. (Cl. 208—165)

This invention relates to a method for the conversion of hydrocarbons and, more particularly, for carrying out such a conversion with improved control over the temperature at which such hydrocarbon conversion takes place. The invention also relates to apparatus adapted for carrying out such an improved process.

Many processes in the petroleum field, such as cracking, polymerization, reforming, coking and desulfurization, use gravitating columns of granular contact solids at elevated temperatures in an enclosed cyclic system. For example, in cracking heavy petroleum stocks to produce lighter hydrocarbons, preferably boiling in the gasoline boiling range, the granular solids are gravitated as a substantially compact bed through a reaction zone where it is contacted with hydrocarbons to effect the cracking reactions, and the converted products are continuously withdrawn from the bed. This process is exemplified by the so-called "moving-bed" or TCC process for hydrocarbon cracking, and this invention will be described with respect to particular application thereto, although it will be appreciated that the invention can be advantageously applied in a variety of processes and is not limited solely to the exemplary TCC process.

During gravitation through the reaction zone in such a process, the granular particles of solid contact material aquire deposits of carbonaceous matter commonly referred to by those familiar with the art as "coke," which must be removed prior to reuse of the contact material in the reaction zone. The granular solids are permitted to continuously gravitate from the lower end portion of the reaction zone, through suitable conduit means into a regeneration zone or kiln, in which the granular solids continuously gravitate as a substantially compact bed and are contacted with a combustion-supporting gas, e.g. air, to effect the combustion of the deposited matter or coke and thereby render the particles suitable for reuse in the reaction zone.

Flue gases are continuously removed from the regeneration zone, carrying with them some of the heat produced by the combustion. In some instances additional portions of the heat produced by the combustion are withdrawn from the regenerated granular solids in a cooling zone which may be located outside of and following the regeneration zone, or may be located between the upper end portion and the lower end portion of the regeneration zone. This cooling zone usually employs conduits to confine a fluid medium for carrying off the heat absorbed from the solids through the walls of the conduits. From the lower end portion of the regeneration zone (kiln) or from the outside cooling zone the granular solids continuously gravitate into a lift pot situated at the lower end of a pneumatic lift pipe. In the lift pipe, the granular solids are elevated in and by a rapidly rising stream of lift gas, generally air, to be deposited at the upper end of the lift pipe into a lift separator in which the solids are disengaged from the current of lift gas. The granular solids then flow from the lift separator in compact gravitating form to maintain the confined column of descending granular solids in the reaction zone.

To avoid premature cracking of the hydrocarbon feed, i.e. before it is fed to the reaction zone, and the concomitant coking in reaction zone feed piping, it is desirable that the hydrocarbon feed temperature is not raised into the cracking temperature range before the feed enters the reaction zone. To supply the heat required to bring the feed introduced at sub-cracking temperature into the cracking temperature range, the granular solids are fed to the reaction zone at a temperature somewhat above the optimum cracking temperature for the desired reaction. When the hydrocarbon feed at a temperature below the cracking range contacts the granular solids at a temperature above that of the hydrocarbon feed in the reaction zone, the aggregate or "mix" temperature is desirably within the temperature range in which the cracking operation will proceed most efficiently.

Desired products of the cracking reaction are in the range of gasoline and light fuel oils. Cracking at a temperature too high will result in excessive yields of low value fixed gases and coke, while cracking at a temperature too low will cause insufficient conversion of the feed to higher value products. Economic efficiency of the process thus depends on cracking at the proper temperature for a given feed and other cracking conditions. The temperature ranges within which conventional cracking reactions are carried out are generally in the range of from 850 to 1000° F., and in many cases, from about 900 to about 975° F.

The nature of the hydrocarbon feed generally determines the temperature to which it can be heated before being fed to the reaction zone without incurring undesirable premature cracking, and this temperature is generally within the range of from 700–830° F. for liquids and from 800–900° F. for vapors. Given a temperature in this range as a maximum reaction zone hydrocarbon feed inlet temperature, the heat capacities of the granular solids and hydrocarbon feed, the heat of vaporization characteristics of the hydrocarbon feed, the flow rates of granular solids and hydrocarbons in the reaction zone, and the optimum cracking temperature of the feed as determined from its cracking yields, the granular solids reaction zone inlet temperature which is the optimum for efficient cracking can readily be determined. However, a narrow range of operable reaction zone inlet temperatures of the granular solids is often imposed by characteristics of the moving-bed process. For instance, an upper temperature limit for the granular solids being fed to the reaction zone is generally fixed at approximately 1075° F. by the design characteristics of the pneumatic lift systems in common use at the present time.

Thus, it is important that the reaction zone inlet temperature of the granular solids should be controlled within close limits for efficient cracking. Further, it is apparent that the uniformity of a cracking operation having a given feed type and temperature and a given solids-to-oil ratio will depend on the maintenance of a reaction zone granular solids inlet temperature which varies only within narrow limits with respect to time. That is, unless the reaction zone granular solids inlet temperature is maintained relatively constant, the cracking temperature will vary, the resulting product distribution will vary, and the overall efficiency of the process will be impaired.

However, a number of variable conditions in the cracking-regeneration cycle of the granular solids influence the reaction zone granular solids inlet temperature sufficiently enough that, as moving-bed processes are currently operated, a reaction zone granular solids inlet temperature of the required uniformity cannot be obtained without frequently applying countervailing control measures to the process. For instance, the usual relatively frequent variations in the nature of the charge stocks being processed alter the amount of coke deposited on the granular solids in the reaction zone and thereby the amount of heat produced and absorbed by the granular solids during coke combustion in the regeneration zone. These variations include changes in vapor-liquid ratio of the feed which affect mix temperature, and changes in size and type of hydrocarbon molecules which yield differing amounts of coke. Alterations of the granular solids: oil ratio required by changes in the nature of the crude oil being processed can affect the granular solids-oil mix temperature in the reactor. Changes in feed or recycle rate can alter the mix temperature and the coke yield, by varying the nature of the combined feed and the ratio of granular solids to oil. Variations in the rate or nature of the fluid used in the cooling zone or of the combustion-supporting gas used to regenerate the granular solids can also affect the granular solids temperature and subsequently the mix temperature. These and other variables of lesser importance, such as the degree of catalytic activity, if any, of the granular solids and atmospheric conditions preclude a steady-state operation in which the cracking temperature in the reaction zone remains substantially constant without frequent corrective measures.

Since these variables fluctuate frequently, corrective measures should be applied quite frequently, or if possible continuously, to maintain a desired reaction temperature. To obtain the maximum advantage from such corrective measures, they should also be applied with as little time lag as possible between observation of fluctuations in granular solids temperature and the effects of compensatory process control measures. However, it is also desirable that such observation be made near the point of desired temperature control in the circulating steam of solids, i.e. at the reactor granular solids inlet, to minimize the error resulting from the time lag between such observation of the solids temperature and the desired temperature control point. An additional problem involved in the control of the circulating solids temperature is that automatic control mechanisms capable of integrating out this error tend to overcompensate for changes in the temperature sensed when operating alone in response to temperature measurements at a point in the granular solids cycle removed from the point of application of temperature corrective measures.

It has been discovered that the deviations in cracking temperature caused by the above-described variables have self-perpetuating and cumulative effects caused by the positive feedback of heat in the solids cycle and the variation of coke yield with cracking temperature, which tends to follow the Arrhenius relation. Upsets can cause the cracking temperature to either cycle or drift. The nature of the upset determines the nature of the effect while the extent of the effect depends upon the granular solids: oil ratio and upon the nature and extent of the upset. For instance, a different hydrocarbon feed which causes a greater deposition of coke causes thereby an increase in temperature of the granular solids following combustion of the coke, and the resulting higher cracking temperature in the reaction zone contributes to an even greater rate of coke deposition than the different hydrocarbon feed would alone have caused. This effect will be repeated in successive catalyst cycles until corrective measures are applied. This tendency of the uncontrolled process toward instability further emphasizes the necessity for continuous control to stabilize granular solids temperatures in the system. In one type of moving-bed installation having solids coolers between the kiln and the lift pot, automatic manipulation of valves in by-pass lines around these coolers affords a ready means of controlling the temperature of solids returning to the reactor. (This type of installation may or may not have a lift gas heater.)

Gas-lift moving-bed installations which have cooling means within the regeneration zone are generally equipped with lift gas heaters having the capacity to heat a normally used stream of lift gas from ambient temperature to any temperature between 300° F. and 1000° F. It is evident from the use of this gas to carry upward at rapid velocities the small granular solids thoroughly dispersed within it that the granular solids temperature can be significantly affected by the temperature of the lift gas. Since the lift gas temperature is the last major factor to affect the temperature of the granular solids before they are returned to the reaction zone, it has great value as a variable controllable to compensate for the effects of fluctuations in other process variables on the cracking temperature.

In view of the desirability of maintaining the reaction zone granular solids inlet temperature within narrow limits and in view of the ready tendency of the frequent granular solids temperature disturbances to become cumulative, it is highly desirable to devise means for constant, accurate and stable granular solids temperature control responsive to changes in the deviation of the regenerated granular solids temperature from the reaction zone granular solids inlet temperature most desirable in view of its effect on process efficiencies.

Accordingly, it is an object of this invention to provide a method, and apparatus for carrying out such a method, for controlling the temperature at which a hydrocarbon conversion reaction takes place.

It is a further object of this invention to provide an improved method, and means suitable for use therefor, for controlling the temperature at which hydrocarbon conversion takes place in a process in which normally-encountered process variables tend to impair process efficiency by causing frequent and often cumulative disruptions of the desired reaction temperature level.

It is a further object of this invention to provide an improved method, and apparatus for carrying out same, for controlling the temperature at which heavy petroleum hydrocarbons are converted to lighter hydrocarbons in a process involving the recycle of granular solids to a hydrocarbon reaction zone from a regeneration zone in which the granular solids are rendered suitable for reuse in the process.

It has now been discovered that the above objects can be realized by automatically controlling the heat content of the regenerated granular solids returned to the reaction zone in response to (1) the temperature of the regenerated granular solids measured at a point in the cyclic flow of the granular solids from the transport zone to the reaction zone and (2) the temperature, and particularly change of temperature of the regenerated granular solids measured at a point in the cyclic flow of the granular solids from and including the lower portion of the regeneration zone to the transport zone. Thus, illustrated by a continuous process employing a moving-bed system for the conversion of a hydrocarbon feed wherein said hydrocarbon feed is contacted in a reaction zone under conversion conditions including an elevated temperature with a mass of granular downwardly-gravitating solids, conversion product and spent granular solids are continuously withdrawn from the reaction zone, the spent granular solids are continuously passed from the reaction zone to a regeneration zone wherein carbonaceous deposits from the conversion reaction are removed from the granular solids, the regenerated granular solids are continuously withdrawn from the regeneration zone and upwardly transported through a transport zone to the reaction zone, and heat is withdrawn from at least a portion of the regenerated granular solids following regeneration and prior to return to the reaction zone, the present invention provides a method and apparatus for controlling the heat content of the granular solids entering the reaction zone. This is accomplished, in accordance with this invention, by utilizing temperature measurements of the regenerated granular solids at defined portions of the cyclic process, e.g. at a point in the flow of the regenerated granular solids from the transport zone to the reaction zone and at a point in the flow of the regenerated granular solids from and including the lower portion of the regeneration zone but prior to withdrawal of heat from said regenerated granular solids following their removal from the regeneration zone, for automatic control of the withdrawal of heat from the regenerated granular solids withdrawn from the regeneration zone.

Thus, in more specific embodiment, the invention is carried out by generating a first input function related to (1) the temperature of the regenerated granular solids measured at a point in the flow of the granular solids from the transport zone to the reaction zone, generating a second input function related to change (2) the temperature of the regenerated granular solids measured at a point in the flow of the granular solids from and including the lower portion of the regeneration zone but prior to the withdrawal of heat from said regenerated granular solids following their removal from the regeneration zone, and applying said first input function and said second input function to automatically control the withdrawal of heat from the regenerated granular solids withdrawn from the regeneration zone. In one particularly suitable embodiment, the transport zone is a pneumatic transport zone through which the regenerated granular solids are upwardly transported by a lift gas, and the control of the withdrawal of heat from the regenerated granular solids withdrawn from the regeneration zone is exercised by controlling the temperature of the lift gas employed in the pneumatic transport zone. In another particularly suitable embodiment regenerated granular solids pass from the regeneration zone to the transport zone via a cooling zone, a portion of the regenerated granular solids from the regeneration zone are passed into the transport zone without passage through the cooling zone, and the control of the withdrawal of heat from the regenerated granular solids withdrawn from the regeneration zone is exercised by correlating the flow of regenerated granular solids that do not pass through the cooling zone with the flow of regenerated granular solids through said cooling zone.

Illustrated by an apparatus for the conversion of a hydrocarbon feed, which comprises a reactor adapted for contacting a hydrocarbon under conversion conditions with a mass of granular downwardly-gravitating solids, means for feeding a hydrocarbon feed into said reactor and means for discharge of conversion product from said reactor, conduit means for passage of said granular solids from said reactor to a regenerator, said regenerator having means for introduction of a combustion-supporting gas into the regenerator and means for discharge of flue gas from said regenerator and which regenerator is adapted to confine the solids from the reactor as a downwardly-gravitating mass from which carbonaceous deposits are combustibly removed, at least one conduit means for discharge of solids from said regenerator to transport means adapted to carry the regenerated granular solids to the reactor, the present invention provides a method and apparatus for controlling the heat content of the granular solids entering the reactor. Such apparatus comprises, in accordance with this invention, means responsive to temperature measurements of the regenerated granular solids at defined portions of the cyclic process for automatically controlling the temperature of the granular solids entering the reactor. Thus, in more specific embodiment, the invention provides the improvement which comprises first temperature measuring means disposed in the path of flow of regenerated granular solids from the transport means to the reactor, second temperature measuring means disposed in the path of flow of regenerated granular solids from and including the lower portion of the regenerator to the transport means, and means responsive to said first temperature measuring means and to said second temperature measuring means for automatically controlling the temperature of the regenerated granular solids passed into the reactor.

In a specific embodiment, the first temperature measuring means is adapted to generate a first input function related to the temperature of the regenerated granular solids flowing past said first temperature measuring means, and the apparatus further comprises a change-of-temperature measuring means responsive to said second temperature measuring means for generating a second input function related to change of temperature of the regenerated granular solids flowing past said second temperature measuring means, and means for applying said first input function and for applying said second input function to automatically control the withdrawal of heat from the regenerated granular solids. In one particularly suitable embodiment, the transport means comprises pneumatic transport means in which the solids are carried to the reactor by a lift gas which is heated prior to contact in the pneumatic transport means with the solids to be transported thereby, and said means responsive to said first temperature measuring means and to said second temperature measuring means is adapted to automatically control the withdrawal of heat from the regenerated granular solids by controlling the temperature to which the lift gas is heated by the lift gas heating means. In another particularly suitable embodiment, the apparatus further comprises a plurality of said conduit means for discharge of regenerated granular solids from said regenerator, at least one of said conduits is associated with a cooling means for cooling solids discharged therethrough, at least one other of said conduits is adapted to pass said solids from the regenerator to the transport means without passage through said cooling means, and said means responsive to said first temperature measuring means and to said second temperature measuring means is adapted to automatically control the withdrawal of heat from the regenerated granular solids by said cooling means by correlating the flow of regenerated granular solids through said other conduit with the flow of regenerated granular solids through said conduit means associated with said granular solids cooling means.

The invention may be understood more readily by reference to the attached diagrammatic drawing and the following detailed description.

In the drawing there is shown a reactor 1 which is adapted to confine a compact downwardly-gravitating mass of granular solids and which may internally incorporate those features (not shown) well known in the art for inducing uniform flow, contacting, engaging and disengaging of the granular solids and the reactant stream. Reactant is continuously fed, such as via feed conduit 2, into reactor 1 and reaction product is continuously withdrawn from reactor 1, such as via reaction product outlet 3, while granular solids enter reactor 1 from a granular solids feed conduit 4 and are continuously downwardly passed at an elevated temperature through the reactor 1 and, via one or more reaction zone outlet conduits 5 to the upper end portion of regenerator 6. To remove the carbonaceous deposits which form on the granular solids as a side effect of hydrocarbon reactions at an elevated temperature in reactor 1, the granular solids are contacted at a high temperature in the regenerator 6 with combustion-supporting gas which is continuously fed to the regenerator 6, such as via combustion gas inlet conduit 7. The combustibly removed deposits are continuously withdrawn from the regenerator 6 in the flue gas stream via flue gas outlets 8. The regenerated granular solids in regenerator 6 are continuously withdrawn in compact form from the regenerator 6 through regenerator outlet conduit 9, or through additional outlet conduits shown as 9', 9", and passed to a pneumatic lift pot 10. In one embodiment of the invention to be discussed more fully hereinafter, there are granular solids coolers, shown as 20' and 20", associated with at least one of regenerator outlet conduits 9, 9', 9", for cooling of the regenerated granular solids withdrawn through the associated conduits. From the lift pot 10, the granular solids are carried upward through the lift pipe 11 to the lift separator 12 by a gas which is heated in a lift gas heater 13 before its introduction into the lift pot 10. The lift gas is withdrawn from the lift separator 12 through a conduit 14, and the granular solids are withdrawn from the lift separator 12 through the granular solids feed conduit 4 and into the reactor 1.

The temperature to which the lift gas is heated in the lift gas heater 13 is, as stated hereinbefore, an important factor in determining the temperature of the granular solids entering reactor 1 and accordingly, the temperature at which the hydrocarbon conversion reaction occurs and the nature of the products therefrom.

It has now been discovered that automatic control of the cooling of the granular solids, following regeneration and prior to return to the reactor, responsive to the temperature of the regenerated granular solids measured at a point in the flow of granular solids from the lift separator 12 to the reactor 1 and responsive to the magnitude of change or, alternatively, the rate of change of the temperature of the regenerated granular solids measured at a point or, measured as an average of a plurality of points, in the flow of granular solids from and including the lower portion of the regenerator 6 to the lift pot 10 can be used to quickly correct for the normal fluctuations in the temperature of the granular solids and thereby maintain the reactor temperature within the temperature range most desirable for high process efficiency.

In a preferred embodiment, a first temperature sensing means 15, e.g. a thermocouple, is situated at a first point in the path of flow of granular solids from the lift separator 12 to the reactor 1, for generating a first temperature function representing the temperature of granular solids at such first point, and a second temperature sensing means 16, e.g. a thermocouple or a plurality of thermocouples, is situated at a second point in the path of flow of granular solids from and including the lower portion of the regenerator 6 to the lift pot 10, for generating a second temperature function representing the temperature of the granular solids at such second point.

In other embodiments, a second temperature sensing means shown as 16' can be situated, in lieu of the second temperature sensing means shown as 16, in a regenerator outlet conduit 9, or additional second temperature sensing means shown as 16", 16''' can also be situated singularly and substantially similarly in additional regenerator outlet conduits 9' and 9". In such alternative embodiments, the second temperature function transmitted from the second temperature sensing means and shown by broken lines in the drawing, is representative of the regenerated catalyst temperature in such regenerator outlet conduit 9 or, in the embodiment comprising temperature sensing means in each of a plurality of regenerator outlet conduits, representing an average of the regenerated catalyst temperatures in the plurality of regenerator outlet conduits. In a preferred embodiment, the temperature sensing means for the second temperature function is located near a point in the granular solids flow which is, in view of the time required for the granular solids to flow from that temperature measuring point to the site of temperature adjustment of the solids, e.g. in the lift pot, and in view of the control-response characteristics of the means for temperature adjustment of the solids, e.g. the lift air heater, the temperature measuring point most useful in minimizing the integral time error in the temperature of the granular solids entering the reactor.

The first temperature function from temperature sensing means 15, representing the granular solids temperature in conduit 4, is converted by a suitable temperature-recording controller TRC-1, as for example of the type manufactured by Moore Products (model 5311 MP53T2-50MW), to a temperature difference function representing the difference between the temperature represented by the first temperature function and a desired temperature for the regenerated granular solids entering the reactor 1. This type of controller provides feed-back control incorporating proportional and integral control actions and through its integral (automatic reset) action continues to increase the correction to increasingly larger values while error is present, to eliminate drift away from the desired temperature setting. A feed-forward controller cannot provide this type of control because it cannot be made responsive to undesirable temperature deviations existing downstream from the point of application of corrective action. However, if the output variable changes in magnitude so that the error changes in sign, the accumulated correction must be integrated out before the proper correction can be applied. Thus integral control alone can be quite sluggist and can lead to overcorrections and a resultant oscillatory response of the process being controlled. This is particularly true of the process described hereinbefore, in which significant time lags can exist between corrective action and measurement of its effect, and overcorrections are often returned to the reactor by the positive feedback effect of the granular solids cycle.

The present invention overcomes the sluggishness of integral control by incorporating in the control system a fast feed-forward derivative control action derived from measurement of changes in granular solids temperature at a point prior to the application of corrective action, thus reducing the need for integral control action for the slow corrections required to reduce any remaining error. The temperature difference function is in this embodiment in a form applicable to change the setpoint of a suitable lift-gas temperature controller TC-4, for example by reducing the setpoint signal to RI-3 and from RI-3 to TC-4, in response to an increase in the temperature sensed by the first temperature sensing means 15.

Temperature controller TC-4 may be of the type of Moore Products model 5311 MP53T2 509M and which, in one embodiment of the invention, controls the fuel gas inlet valve 18 to the lift gas heater 13. Preferably, there are inserted in the lift gas heater fuel gas inlet control system a pressure control means shown as PC-5 so that fluctuations in the fuel gas source pressure are offset by automatic resettings of the fuel gas inlet valve 18 in response to such fluctuations. With further reference to the drawing, there is shown a suitable temperature-sensing location 19 in the lift gas heater outlet and the transmission of a signal representing such temperature to temperature control means TC-4 which, responsive to such temperature, alters the setting of the lift gas heater fuel inlet valve 18 to compensate for changes in the heating value of the fuel gas. Working together, pressure control means PC-5 and means for resetting fuel inlet valve 18 responsive to changes in fuel heating value insure that the temperature to which the lift gas is heated in the lift gas heater will be proportionally reset responsive to the lift gas temperature control function supplied to TC-4 according to the principles of this invention.

The second temperature function from temperature sensing means 16 or, alternatively, from one of or a plurality of temperature sensing means 16', 16", and 16''', representing the granular solids temperature in the lower portion of the regenerator 6 or in one or a plurality of regenerator outlet conduits 9, 9', and 9", respectively, is in this embodiment converted to a signal proportional to the second temperature function by a suitable temperature indicating control station TIC-2, as for example of a type such as Moore Products model 524 MT2, equipped with a suitable proportional controller, as for example of the type of Moore Products model 50MX. The resulting signal is applied by a suitable inverted impulse relay RI-3 to the temperature difference function from TRC-1 to add to or subtract from the temperature difference function from TRC-1 a correction of the effect of the temperature difference function on the setpoint of TC-4, said correction being directly related to the rate of change of the second temperature function.

For example, a signal from TIC-2 proportional to an increasing granular solids temperature at 16 would be applied by RI-3 to decrease the value of the temperature difference signal from TRC-1 to TC-4, by an amount proportional to the rate of increase of the granular solids temperature at 16. Conversely, a signal from TIC-2 proportional to a decreasing granular solids temperature at 16 would be applied by RI-3 to increase the value of the temperature difference signal from TRC-1 to TC-4, by an amount proportional to the rate of decrease of the granular solids temperature at 16. In this embodiment, the signal from TIC-2 is in the form of a fluid pressure proportional to the granular solids temperature it represents, and the temperature difference function from TRC-1 is corrected by RI-3 in an amount proportional to the rate of change of the pressure signal from TIC-2. In such an embodiment, RI-3 is of the type of Moore Products model 68V13 and the aforedescribed correction of the temperature difference function from TRC-1 is obtained by applying to such function a signal representing the differential in pressure between the TIC-2 signal and the pressure in a bleed chamber in communication in RI-3 with the TIC-2 pressure signal by means of a bleeder valve. By use of such a bleeder valve apparatus, an increase (or decrease) in the TIC-2 pressure signal establishes a pressure differential between the signal and the bleed chamber and exerts a corrective effect on the temperature difference function from TRC-1. However, when the pressure signal from TIC-2 stabilizes, the bleed chamber pressure and the signal pressure become equalized after a time period dependent on the setting of the bleeder valve, and there is no further corrective effect on the TRC-1 function until the granular solids temperature at 16 and the TIC-2 signal begins to increase or decrease again. Although the aforedescribed means for applying such corrective effects to the temperature difference function from TRC-1 are particularly applicable to the present invention, it should be appreciated that other control means can be substituted therefor within the scope of this disclosure and the appended claims.

In an alternative embodiment of the invention, impulse relay RI-3 is omitted and TIC-2 is equipped with a temperature setting and adapted for direct proportional control of TC-4 by means of a signal emitted by TIC-2 and representing the difference between the granular solids temperature sensed at 16 and the TIC-2 setting, which is continually reset by the temperature difference function emitted by TRC-1, to eliminate granular solids reactor inlet temperature error caused by the proportional action of TIC-2 differing from that required to maintain the desired granular solids reactor inlet temperature. In this embodiment, the magnitude of changes in the temperature sensed at 16 are proportionally reflected in the setpoint of TC-4, which applies proportional-integral-derivative control over PC-5 and thereby over the position of fuel gas valve 18. For example, a temperature difference function from TRC-1 indicating that the granular solids temperature sensed at 15 is higher than that desired (the TRC-1 setting) would lower the TIC-2 setting, thereby increasing the TIC-2 signal (assuming a constant granular solids temperature at 16), lowering the TC-4 setpoint, decreasing the lift gas temperature and decreasing the granular solids reactor inlet temperature. Conversely, a TRC-1 temperature difference function indicating that the solids temperature sensed at 15 is lower than that desired (the TRC-1 setting) would raise the TIC-2 setting, thereby decreasing the TIC-2 signal (assuming a constant solids temperature at 16), raising the TC-4 setpoint, increasing the lift gas temperature and increasing the solids reactor inlet temperature. Also for example, a negative change in the granular solids temperature sensed at 16 would decrease the TIC-2 signal (assuming a constant granular solids temperature at 15 and therefore a constant TIC-2 setting), thereby raising the TC-4 setpoint, increasing the lift gas temperature and avoiding an imminent decrease in the granular solids reactor inlet temperature. Conversely, a positive change in the granular solids temperature sensed at 16 would increase the TIC-2 signal (assuming a constant granular solids temperature at 15 and therefore a constant TIC-2 setting), thereby lowering the TC-4 setpoint, decreasing the lift gas temperature and avoiding an imminent increase in the granular solids reactor inlet temperature. In the event that both of the solids temperatures sensed at 15 and 16 change simultaneously, two of the preceding examples would be applicable, and their respective effects on the TC-4 setpoint would be superimposed in a cascade relation in which the two superimposed effects may be in cumulative or offsetting relation to each other with respect to their individual effects on the TC-4 setpoint, depending on whether the solids temperature changes at 15 and 16 are alike or different in sign.

In the alternative embodiment of the invention mentioned hereinbefore, in which at least a portion of the regenerated granular solids is cooled before being fed to the pneumatic transport means 10–12, that portion can be passed through one or more granular solids coolers, shown as 20′ and 20″, associated with regenerator outlet conduits 9′ and 9″ respectively. Such coolers can utilize a circulating fluid medium to absorb and conduct away the heat given off by the regenerated granular solids descending through conduits 9′ and 9″. The portion of the granular solids stream leaving the regenerator, which is cooled by passage through granular solids coolers 20′, 20″ is determined by the setting of a bypass control valve 21 which controls the flow of granular solids through regenerator outlet conduit 9 which is adapted in this embodiment of the invention to function as a bypass around coolers 20′, 20″. In this alternative embodiment, control valve 21 can be made responsive to the signal transmitted by RI-3 through an instrumentation line shown in the drawing as an alternate to the line from RI-3 to TC-4, with RI-3 responsive to TRC-1 and TIC-2 in the same manner as in the embodiment employing lift gas heating control as described hereinbefore. For example, in response to an increase in temperature at the first temperature sensing means 15, the signal from TRC-1 to RI-3 and therefrom to control valve 21 would be reduced, causing control valve 21 to assume a more nearly closed position and thereby diverting a greater fraction of the granular solids flow from regenerator 6 through coolers 20′ and 20″, thus reducing the temperature of the granular solids being passed to reactor 1; in response to an increasing granular solids temperature sensed at 16, a signal from TIC-2 to RI-3 representing the increased temperature would decrease the value of the temperature difference signal from TRC-1 to control valve 21, again causing control valve 21 to assume a more nearly closed position. Alternately, the proportional-integral action of TRC-1 and the proportional action of TIC-2 may be applied in the cascade relation described hereinbefore, to adjust the position of valve 21.

In another specific embodiment of the invention the moving-bed system is operated using granular solids comprising an active cracking catalyst, and in which the regeneration step restores the effective activity of the catalyst by combustibly removing the carbonaceous deposits which inhibit such activity. The catalyst may be in any of many suitable forms and, as examples, in the form of pellets, pills, uniform granules, or spheres, and others. The term "granular," when used in this specification and the claims, refers broadly to particulate solids, whether regular or irregular, uniform or non-uniform. Although it is not intended to limit the granular solids to particular size, suitable particle sizes include the range of about 3–60 mesh, preferably 4–12 mesh, Tyler screen analysis. The catalytic material may be natural or treated clays, illustrative of which are bentonite, montmorillonite, kaolin, etc., or they may be in the nature of certain synthetic associations of silica, alumina, silica and alumina, with or without various additions of metallic oxides.

In a specific typical application of the invention using such a cracking catalyst, the reactant enters the reactor 1 as a vaporized mixture of petroleum hydrocarbons, for example a 480–950° F. Mid-Continent gas oil cut. The reactant is preheated in a heater (not shown) to a temperature of about 847° F. Active catalyst of the type described hereinbefore enters reactor 1 from conduit 4 at a temperature of 1060° F. and at a catalyst:gas oil ratio of approximately 3.3 wt./wt. (3.6 vol./vol.). The hydrocarbon conversion reaction takes place at a "mix temperature" of reactant and catalyst of about 965° F. and a pressure of about 10 p.s.i.g. Conversion product is continuously withdrawn from the reactor 1 via conduit 3 and deactivated catalyst is continuously withdrawn from the reactor 1 at about 900° F. through one or more reactor outlet conduits 5 to the upper end portion of regenerator 6. The combustion in the regenerator 6 of the deposits on the catalyst causes the catalyst temperature to rise to about 1450° F. Ordinarily, the reaction step of the process is conducted so as to avoid a rate of coke deposition which would cause regenerator temperature to exceed about 1475° F., or, when using some types of aluminosilicate catalysts incorporating certain metallic oxides, 1350° F., since a loss in catalytic activity generally occurs if catalyst of that type is heated much in excess of these temperatures. To cool the regenerated catalyst to a temperature which can be withstood by the ordinary catalyst lift system of the types in present use, heat is often removed from the catalyst as it passes through a cooling zone in or following the regenerator 6. For example, as the catalyst descends through conduits 9, 9', and 9'', a portion thereof, the amount of which can be controlled by valve 21, may be cooled to a temperature approximating 1075° F. by one or more catalyst coolers shown as 20' and 20'' associated with conduits 9' and 9'' respectively.

The lift gas heater 13 in conventional use in such systems can be controlled to heat the lift gas to a temperature within the range of 300–1000° F. For use in systems employing a catalyst of the types described in connection with this embodiment of the invention, air is a suitable lift gas. The desired temperature of the lift gas is that which will alter the temperature of the regenerated catalyst, by direct contact in the pneumatic lift system 10–12, to the catalyst temperature desired at the reactor catalyst inlet. In the present embodiment, the desired reactor catalyst inlet temperature of 1060° F. can be accomplished by controlling the lift gas heater fuel gas inlet valve 18 to heat the air used as the lift gas in this embodiment of the invention to a temperature of 650° F. Such control over fuel inlet valve 18 is accomplished by an automatic control system of the type described hereinbefore and shown in the drawing as comprising TRC–1, TIC–2, RI–3, and TC–4, which, responsive to the temperature of the regenerated catalyst measured at 15 in conduit 4, and to the rate of change (or in the alternative embodiment comprising TRC–1, TIC–2 adapted for operation with a temperature setpoint responsive to TRC–1, and TC–4, the magnitude of change) of the temperature of the regenerated catalyst measured at 16 in the lower portion of regenerator 6, or, alternatively, measured as an average of the temperatures at one or more of points 16', 16'', 16''' in the regenerator outlet conduits 9, 9', 9''', controls the setting of the lift gas heater fuel gas inlet valve 18. Alternatively, reactor catalyst inlet temperature can be regulated, as in the aforedescribed system employing granular solids, by automatic control of valve 21 responsive to the same type of automatic temperature controls.

From the foregoing, it can be seen that in accordance with the present invention, the effect on the temperature of the regenerated catalyst entering the reactor resulting from, for example, a variation in the amount of coke deposited on the catalyst before regeneration, will be automatically offset by appropriate adjustments of the setting of the lift gas heater fuel gas inlet valve 18, or of bypass control valve 21, and further, that a constantly operating automatic control of the lift gas heater fuel gas inlet valve 18, or of the bypass control valve 21, made properly responsive to the temperature of catalyst entering the reactor and the rate of change or, alternatively, the magnitude of change of the temperature of the regenerated catalyst will advantageously utilize the capacity of lift air temperature control or of catalyst cooler bypass valve control for offsetting undesirable variations in the reactor catalyst inlet temperature.

The method and means of the present invention for controlling the temperature of the regenerated granular solids entering the reactor provide the unique combination of (1) feed-forward control, which utilizes measurement of change of granular solids temperature immediately following regeneration to virtually eliminate the time lag between the detection of temperature fluctuations and the initiation of corrective action by adjustment of lift gas temperature or of the granular solids cooler bypass valve and (2) feed-back proportional-integral control, which utilizes measurement of the granular solids temperature at a point in the flow of the solids just prior to the reactor inlet to eliminate the potential for drift inherent in using only feed-forward control.

This novel combination, by providing granular solids temperature control responsive to temperature measurements both before and following the portion of the cyclic flow of the solids in which corrective temperature-control action can be applied, offers certain advantages over systems using temperature control responsive to temperature measurement either before or following that portion in which such corrective action is applied. For example, feed-forward control alone will seldom compensate correctly for solids temperature changes because it cannot respond to the granular solids temperature at the reactor inlet which is the process condition desirably controlled. This deficiency can result in a cumulative drift of solids temperature. On the other hand, feed-back control can detect the error between the desired and actual reactor solids inlet temperature values and can continuously act to reduce this error and thus to eliminate drift. However, because of the time lag inherent in making corrections for temperature changes and in detecting the effects of such actions, the corrective action called for by the temperature of the solids passing the detecting element at a given instant can be applied only to a portion of the circulating solids which will pass the detecting element at some later time. Thus, if an overcorrection has been applied, the controller will respond to this overcorrection as an error of opposite sign when the overcorrected portion of the solids passes the detector, and the controller will then make a correction of the in appropriate sign to solids then passing the point at which correction is applied in the system. If the time required to make a correction and to detect the result approaches one-half of the time required for the solids to complete the system cycle, a feedback controller operating alone can cause one half of the solids to become increasingly lower in temperature, and the other half to become increasingly higher in temperature. However, the temperature change feed-forward control of the present invention prevents this from happening by ensuring that the correction has the proper sign. Thus, the present invention provides means and a method whereby the reactor granular solids inlet temperature can be readily controlled to stable predetermined values, with a resulting increase in reaction process efficiency.

Although the present invention has been described with preferred embodiments, it should be understood that the control principles of the present invention are applicable to many other processes involving positive feedback of heat or material in which adverse time delays may be present, and that any of many suitable types of control means, e.g. electrical means or pneumatic means, can be used in the apparatus of this invention. Accordingly, it should be understood that resort to modifications and variations may be had, without departing from the spirit and scope of this invention, as those skilled in the art will readily understand. Such variations and modifications are therefore considered to be within the purview and scope of the appended claims.

What is claimed is:

1. In a continuous process for the conversion of a hydrocarbon feed wherein said hydrocarbon feed is contacted in a reaction zone under conversion conditions including an elevated temperature with a mass of granular solids, conversion product and spent granular solids are continuously withdrawn from the reaction zone, the spent granular solids are continuously passed from the reaction zone to a regeneration zone wherein carbonaceous deposits from the conversion reaction are removed from the granular solids, the regenerated granular solids are continuously withdrawn from the regeneration zone and upwardly transported through a transport zone to the reaction zone, and heat is withdrawn from at least a portion of the regenerated granular solids following regeneration and prior to return to the reaction zone, the improvement for controlling the heat content of the granular solids entering the reaction zone which comprises generating a first input function representative of (1) the temperature of the regenerated granular solids at a point in the flow of the granular solids from the transport zone to the reaction zone, generating a second input function representative of (2) the temperature of the regenerated granular solids at a point in the flow of the granular solids from and including the lower portion of the regeneration zone but prior to withdrawal of heat from said regenerated granular solids following their removal from the regeneration zone, and applying said first and second input functions to automatically control the withdrawal of heat from the regenerated granular solids withdrawn from the regeneration zone.

2. A method, as defined in claim 1, in which said second input function is related to change of said measured temperature (2), and said first input function and said second input function are applied to control the withdrawal of heat from the regenerated granular solids.

3. A method, as defined in claim 2, in which said first input function and said second input function are combined to generate a composite input function, which is applied to control the withdrawal of heat from the regenerated granular solids.

4. A method, as defined in claim 2, in which said first input function tends to increase the withdrawal of heat from the regenerated granular solids while said measured temperature (1) is above a predetermined temperature and to decrease the withdrawal of heat from the regenerated granular solids while said measured temperature (1) is below a predetermined temperature.

5. A method, as defined in claim 2, in which said second input function tends to vary the withdrawal of heat from the regenerated granular solids in direct relation to the rate of change of said measured temperature (2).

6. A method, as defined in claim 2, in which said second input function tends to vary the withdrawal of heat from the regenerated granular solids in direct relation to the magnitude of change of said measured temperature (2).

7. A method, as defined in claim 2, in which the transport zone is a pneumatic transport zone through which the regenerated granular solids are upwardly transported by a lift gas, in which the pneumatic transport zone is a cooling zone wherein the regenerated granular solids are cooled by the lift gas heated to a temperature below that of the regenerated granular solids entering the pneumatic transport zone, and in which the withdrawal of heat from the regenerated granular solids in the pneumatic transport zone is controlled by controlling the temperature of the lift gas.

8. A method, as defined in claim 2, in which regenerated granular solids pass from the regeneration zone to the transport zone via a cooling zone, a portion of the regenerated granular solids from the regeneration zone are passed into the transport zone without passage through the cooling zone, and withdrawal of heat from the regenerated granular solids that pass into the transport zone is controlled by correlating the flow of regenerated granular solids that do not pass through the cooling zone with the flow of regenerated granular solids through said cooling zone.

9. A method, as defined in claim 2, in which said measured temperature (2) of the regenerated granular solids is measured at a point in the flow of the granular solids in the lower end portion of the regeneration zone.

10. A method, as defined in claim 1, in which the mass of granular solids comprises a catalyst for cracking of hydrocarbons, the transport zone is a pneumatic transport zone through which the reactivated catalyst is upwardly transported by air, a first input function is generated that is related to the reactivated catalyst temperature measured at a point in the flow of catalyst from the pneumatic transport zone to the reaction zone, a second input function is regenerated that is related to change of the reactivated catalyst temperature measured at a point in the flow of catalyst from and including the lower portion of the regeneration zone to the pneumatic transport zone, and said first input function and said second input function are applied to control the withdrawal of heat from the reactivated catalyst withdrawn from the regeneration zone.

11. An apparatus which comprises a reactor adapted for contacting a hydrocarbon under conversion conditions with a mass of granular solids, means for feeding a hydrocarbon feed into said reactor and means for discharge of conversion product from said reactor, conduit means for passage of said granular solids from said reactor to a regenerator, said regenerator having means for introduction of a combustion-supporting gas into the regenerator and means for discharge of flue gas from said regenerator and which regenerator is adapted to confine the solids from the reactor as a mass from which carbonaceous deposits are combustibly removed, at least one conduit means for discharge of solids from said regenerator to transport means adapted to carry the regenerated granular solids to the reactor, first temperature measuring means disposed in the path of flow of regenerated granular solids from said transport means to said reactor, second temperature measuring means disposed in the path of flow of regenerated granular solids from and including the lower portion of the regenerator to the transport means, and means responsive to said first temperature measuring means and to said second temperature measuring means for automatically controlling the temperature of the granular solids passed into the reactor.

12. An apparatus, as defined in claim 11, in which said first temperature measuring means is adapted to generate a first input function related to the temperature of the regenerated granular solids flowing past said first temperature measuring means, and further comprises a change-of-temperature measuring means responsive to said second temperature measuring means for generating a second input function related to change of temperature of the regenerated granular solids flowing past said second temperature measuring means, and means for applying said first input function and for applying said second input function to automatically control the withdrawal of heat from the regenerated granular solids.

13. An apparatus, as defined in claim 12, in which said means for applying said first input function is adapted to effect an increase in the withdrawal of heat from the granular solids while the temperature measured by said first temperature measuring means is above a predetermined temperature and to effect a decrease in the withdrawal of heat from the granular solids while the temperature measured by said first temperature measuring means is below a predetermined temperature.

14. An apparatus, as defined in claim 12, in which said means for applying said second input function is adapted to vary the withdrawal of heat from the granular solids in direct relation to the rate of change of temperature of the granular solids flowing past said second temperature measuring means.

15. An apparatus, as defined in claim 12, in which said means for applying said second input function is adapted to vary the withdrawal of heat from the granular solids in direct relation to the magnitude of change of temperature of the granular solids flowing past said second temperature measuring means.

16. An apparatus, as defined in claim 12, further comprising means for combining said first input function and said second input function into a composite input function, and said means for applying said first input function and for applying said second input function comprises means for applying said composite input function to automatically control the withdrawal of heat from the regenerated granular solids.

17. An apparatus, as defined in claim 11, in which the transport means comprises pneumatic transport means in which the solids are carried to the reactor by a lift gas, further comprising means for heating the lift gas prior to contact in the pneumatic transport means with the solids to be transported thereby, and in which said means responsive to said first temperature measuring means and to said second temperature measuring means is adapted to automatically control the withdrawal of heat from the regenerated granular solids by controlling the temperature to which the lift gas is heated by the lift gas heating means.

18. An apparatus, as defined in claim 11, which further comprises a plurality of said conduit means for discharge of regenerated granular solids from said regenerator, in which at least one of said conduit means is associated with a cooling means for cooling solids discharged therethrough and at least one other of said conduit means is adapted to pass said solids from the regenerator to the transport means without passage through said cooling means, and in which said means responsive to said first temperature measuring means and to said second temperature measuring means is adapted to automatically control the withdrawal of heat from the regenerated granular solids by said cooling means by correlating the flow of regenerated granular solids through said other conduit with the flow of regenerated granular solids through said conduit means associated with said granular solids cooling means 19. An apparatus, as defined in claim 18, which further comprises valve means disposed in said other conduit means for regulating the flow of solids therethrough, and in which said means responsive to said first temperature measuring means and to said second temperature measuring means comprises means to control said valve means.

20. An apparatus, as defined in claim 12, in which the second temperature measuring means is disposed in the path of flow of regenerated granular solids in the lower end portion of the regenerator.

21. An apparatus, as defined in claim 12, in which the second temperature measuring means is disposed in said conduit means for discharge of solids from said regenerator to the transport means.

22. An apparatus, as defined in claim 12, which further comprises a plurality of conduit means for discharge of regenerated granular solids from said regenerator to said transport means, and in which said second temperature measuring means is disposed at a plurality of points each of which is singularly and substantially similarly located in one of said plurality of conduit means.

References Cited by the Examiner

UNITED STATES PATENTS

| | | | |
|---|---|---|---|
| 2,711,386 | 6/1955 | Delaplaine | 208—174 |
| 2,897,139 | 7/1959 | Bergstrom et al. | 208—165 |
| 3,000,812 | 9/1961 | Boyd | 208—138 |

DELBERT E. GANTZ, *Primary Examiner.*

A. RIMENS, *Assistant Examiner.*